(12) United States Patent
Garrigus et al.

(10) Patent No.: US 7,137,596 B2
(45) Date of Patent: Nov. 21, 2006

(54) AIRCRAFT SURFACE ICE INHIBITOR

(75) Inventors: Darryl F. Garrigus, Issaquah, WA (US); Andrea C. Saunders, Seattle, WA (US); Tuan D. Nguyen, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 556 days.

(21) Appl. No.: 10/161,238

(22) Filed: May 31, 2002

(65) Prior Publication Data

US 2003/0222176 A1    Dec. 4, 2003

(51) Int. Cl.
*B64D 15/00* (2006.01)

(52) U.S. Cl. .............................. 244/134 R; 244/134 E; 244/123

(58) Field of Classification Search ............ 244/134 E, 244/134 R, 134 A, 132, 133, 119, 123
See application file for complete search history.

(56) References Cited

U.S. PATENT DOCUMENTS

| | | | | |
|---|---|---|---|---|
| 4,052,782 A | * | 10/1977 | Weinstein et al. ............ 438/64 |
| 4,095,760 A | * | 6/1978 | Sommer et al. ............. 244/123 |
| 4,139,024 A | * | 2/1979 | Adorjan ....................... 138/149 |
| 4,284,674 A | * | 8/1981 | Sheptak ......................... 428/69 |
| 5,018,328 A | * | 5/1991 | Cur et al. .................. 52/406.2 |
| 5,240,759 A | * | 8/1993 | Layton ........................ 428/131 |
| 5,419,139 A | * | 5/1995 | Blum et al. ................... 62/45.1 |
| 5,427,332 A | * | 6/1995 | Rauckhorst, III et al. ... 244/134 A |
| 5,558,304 A | * | 9/1996 | Adams .................... 244/134 A |
| 5,743,494 A | * | 4/1998 | Giamati et al. .......... 244/134 E |
| 6,196,500 B1 | * | 3/2001 | Al-Khalil et al. ........ 244/134 R |
| 6,330,986 B1 | * | 12/2001 | Rutherford et al. ..... 244/134 E |
| 6,352,601 B1 | * | 3/2002 | Ray ............................. 156/71 |
| 6,506,293 B1 | * | 1/2003 | Rumpf ........................ 205/186 |

* cited by examiner

*Primary Examiner*—Ricardo J. Palabrica
(74) *Attorney, Agent, or Firm*—John C. Hammar

(57) ABSTRACT

A surface treatment 10 for application to an aircraft wing surface 12 is provided, including at least one reflective metallic film 22 bonded at least one hollow cell structure 24 to provide a thermal barrier that inhibits non-environmental frost formation.

5 Claims, 2 Drawing Sheets

AIRCRAFT SURFACE ICE INHIBITOR

TECHNICAL FIELD

The present invention relates generally to an aircraft surface ice inhibitor, and more particularly to an aircraft wing surface treatment for inhibiting the formation of non-environmental frost and ice.

BACKGROUND OF THE INVENTION

The problem of ice or frost building up on airplane wing surfaces has been a concern for the aviation industry for decades. Wing surfaces are known to frost-up even in good, albeit humid, weather conditions. One source of this phenomenon is known to occur when moisture laden air comes into contact with cold wing skin areas that are over, and in direct contact with, very cold jet fuel in the engine fuel tank reservoirs within the aircraft wings. Such frosting can occur each time an aircraft lands as long as such very cold jet fuel remains in contact with wing skin areas.

The physics behind the frosting phenomenon is well known. After a certain length of flight time at cruising altitudes, wing tank fuel temperature can reach −40 degrees F. When the wing fuel reaches such low temperatures it is commonly referred to as "cold soaked". For reasons of aerodynamic stability, relatively warm "belly" fuel on an aircraft is typically burned first. This often leaves the "cold soaked" fuel undisturbed in the wings during short duration flights. This "cold soaked" fuel, when remaining in contact with the wing surface, can result in non-environmental frosting upon landing. This is particularly problematic, if a particular airline route or schedule of flights should involve a number of short hops to pick up addition passengers or cargo. Often these stops are required to be of short duration for economic reasons. The non-environmental frosting can prevent an aircraft from maintaining a quick turnabout on these short hops and may cut into the benefits or gains that may otherwise be realized.

The desire for a quick turnabout from landing to takeoff can conflict with the necessities of dealing with such non-environmental frosting occurring after landing. Although an airline may allot only fifteen or twenty minutes for a given stop, a heavy coat of frost and ice may rapidly form on the top surface of the wings after only five or ten minutes on the ground. FAA regulations may then require the captain of the airplane to either wait for ambient airport weather conditions to eliminate the frost and ice formations or actively have the wings de-iced. Each of these solutions requires a penalty of time and money to implement. Many de-icing procedures can carry with them environmental concerns as well. Therefore, current approaches towards the removal of non-environmental icing often are not compatible with the airline industries goals involving scheduling, cost savings, and time management.

Therefore, it would be highly beneficial to have a pro-active method of preventing/inhibiting the formation of non-environmental frost/ice on airplane wings such that time consuming and costly de-icing procedures would not be required. It would be additionally beneficial if such a method and apparatus was implementable on existing aircraft such that the benefits of such technology would be quickly appreciated by the airline industry. Finally, it would be desirable for such a system to be produced, installed, and maintained with relatively low costs such that the impact of implementing such technology into existing airline fleets would be minimized.

SUMMARY OF THE INVENTION

It is, therefore, an object of the present invention to provide a surface treatment for application to an aircraft wing surface that is capable of inhibiting the formation of non-environmental frost and icing. It is a further object of the present invention to provide an aircraft wing surface treatment for inhibiting the formation of non-environmental frost and ice that can be implemented without prohibitive cost or retrofitting requirements.

In accordance with the objects of the present invention, a surface treatment for application to an aircraft wing surface is provided. The surface treatment includes at least one reflective metallic film. The surface treatment further includes at least one hollow cell structure bonded to the at least one reflective metallic film. The surface treatment can be bonded to the aircraft wing surface such that a thermal barrier is created between the aircraft wing surface and the outside environment. In this fashion, the formation of non-environmental frosting and icing is inhibited.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
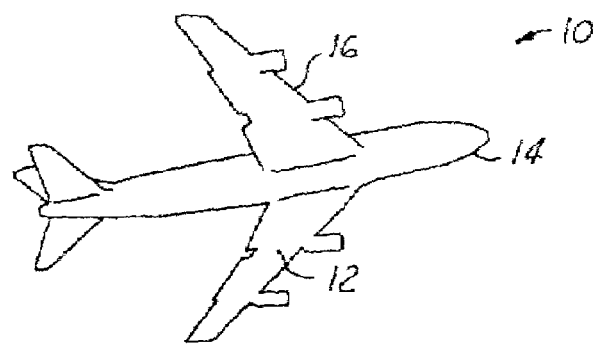
FIG. 1 is an illustration of an aircraft as intended for use with an embodiment of the present invention.

Referring now to FIG. 1, which is an illustration of a surface treatment 10 for application to an aircraft wing surface 12. The aircraft 14 illustrated in FIG. 1 is for illustrated purposes only. It should be understood that the present invention is contemplated to be applicable to a wide variety of aircraft 14 and may in fact be applicable to any surface in which non-environmental icing is a concern.

The operational principle of the present invention is based upon preventing or reducing the thermal conduction losses that start at the air/wing-surface boundary layer 16. The present invention attenuates the otherwise normal flow of atmospheric heat as it transfers through the paint-skin and aluminum sheet (or other aircraft material) of the airplane wing surface 12 to a level that will not allow condensation of atmospheric moisture. In existing untreated conditions the thermal conductivity of the paint-skin, although relatively low, is often sufficient to carry the physically small quantity of heat flux that will result in condensation of atmospheric moisture and ultimately frost. The temperature gradient across the boundary layer is essentially uniform across its thickness as a result of the very large mass of "cold fuel" relative to the small mass of the overlying skin layer. As a result, there can be enough heat transfer through conduction to allow air moisture to condense, and then freeze, on wing surfaces 12. It should be understood, that for the purposes of this application, the term "wing surfaces" 12 is intended to include a variety of surfaces on the aircraft 14 including, but not limited to, the empennage.

Figure 5:
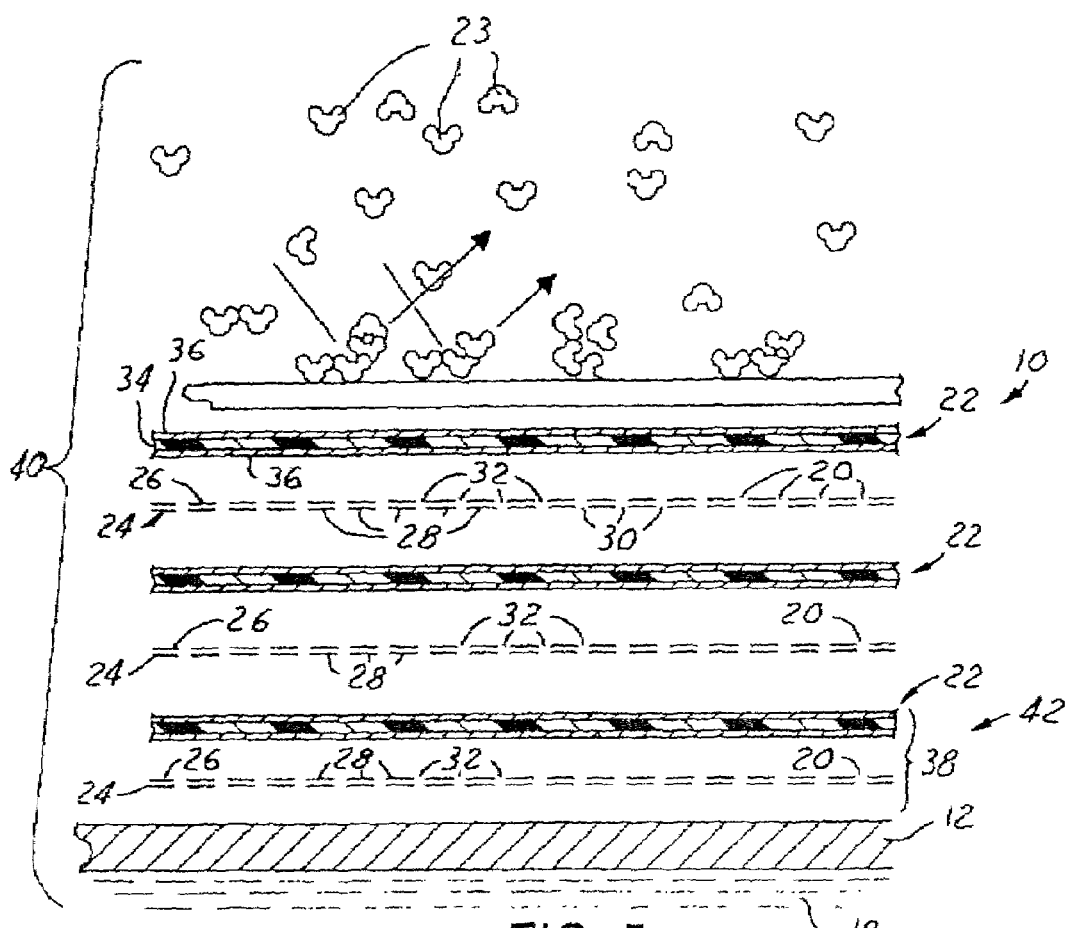
FIG. 5 is an exploded cross-sectional illustration of the surface treatment illustrated in FIG. 3, the exploded cross-section illustrating the surface treatment's interaction with the outside environment.

The present invention addresses this problem by means of reducing thermal conduction, convection and radiation through the wing skin 12 into the mass of cold fuel 18 (see FIG. 5) to a low value to prevent frost formation. The present invention accomplishes this task by emulating the well known operating principals of the "Dewar" flask without the necessity of forming a vacuum space boundary. It should be understood, however, that the present invention contemplates the use of an actual vacuum space boundary if producible utilizing cost effective manufacturing processes. In lieu of an actual vacuum barrier, however, the present invention utilizes a dead air space 20 maintained between at least one reflective metallic film 22. Again, it should be understood, however, that the term dead air space 20 is intended to include a vacuum if practical. The reflective metallic film 22 and dead air space 20 work in combination to prevent water vapor 23 in the atmosphere from forming frost.

Although the dead air space 20 can be achieved in a variety of fashions, one embodiment contemplates the use of a hollow cell structure 24 such as a very thin (<1 mm) webbing fabric 26. A variety of webbing fabrics 26 or other scrims (such as Kevlar scrim) are contemplated by the present invention and would become obvious in light of the present disclosure. The advantage of the hollow cell structure 24 is that the physical contact area 28 it provides is relatively small compared to the area of the dead air space 20. Thus thermal transfer through conduction is only allowed across the relatively small physical contact are 28 and is thereby minimized. Furthermore, thermal transfer through convection is also minimized since each cell 30 and its corresponding dead air space 20 is essentially isolated from the others. Effectively, it behaves as an immense matrix of "dead air" pockets 32. Finally, layering multiple hollow cell structure 24 and reflective metallic film 22 combinations can minimize heat transferred across the boundary layer due to radiation. In this fashion, heat transfer can be minimized and the condensation/frost production can be reduced or eliminated. Although the hollow cell structure 24 can be attached to the reflective metallic film 22 and/or the airplane wing surface 12 in a variety of fashions, one embodiment contemplates that the hollow cell structure 24 is adhesively bonded to these structures.

In addition to the flexibility of the present design to accommodate a variety of hollow cell structures 24, the present invention contemplates a variety of reflective metallic films 22. The term reflective, for example, although intended to encompass a variety of reflective surfaces is in one embodiment contemplated to be specifically infrared (IR) reflective. Additionally, in one embodiment, illustrated in FIG. 5, it is contemplated that the reflective metallic film 22 is comprised of a polymer film 34, such as mylar, with a metal coating 36, such as gold or aluminum. Although a variety of metal coatings 36 are contemplated, one embodiment utilizes a mirrored coating. Extremely thin metal coatings 36 on Mylar films 34 that are only 0.00024 inch think are available and are known as "super insulation". These are but one form of metallic films 22 contemplated. The metal coating 36 can be applied in a variety of fashions, however in one embodiment vacuum deposit applications are contemplated. The metal coating 36 may be applied either on a single side of the polymer film 34 but is preferably applied to both sides of the polymer film 34 (dual-sided coating). When combined with the hollow cell structure 24, the reflective metallic film 22 thereby creates a "Dewar" process in combination with increased IR reflection and re-radiation off the aluminum/gold metal coating 36 on either or both sides of the hollow cell structure 24 presents an effective barrier to frost formation.

Although a single layer 38 of reflective metallic film 22 and hollow cell structure 24 can be utilized, the present invention is preferably utilized with multiple layers 40. Each additional layers allows multiple reflections within each polymer film 34 between each metal coating 36 as well as reflections between each of the multiple layers 40. The multiple layers 40 can be utilized to trap increasing wavelength infra-red radiation from the atmosphere such that longer wavelength infra-red radiation is trapped in layers 42 closes to the wing surface 12. Although the quality and performance of individual layers 38 may be modified and improved upon through further development, it is contemplated that in certain embodiments a minimum number of multiple layers 40 may be necessary in order to properly prevent frost formation. In one such embodiment, for example, a minimum of three individual layers 38 is required. In another embodiment, the number of individual layers 38 may be dictated by a minimum thickness of the surface treatment 10 necessary for effective performance. An example of such a requirement is a surface treatment 10 having a thickness of 2 mm or more, thereby dictating the use of two or more individual layers 38 having a thickness of approximately 1 mm each.

Figure 2:
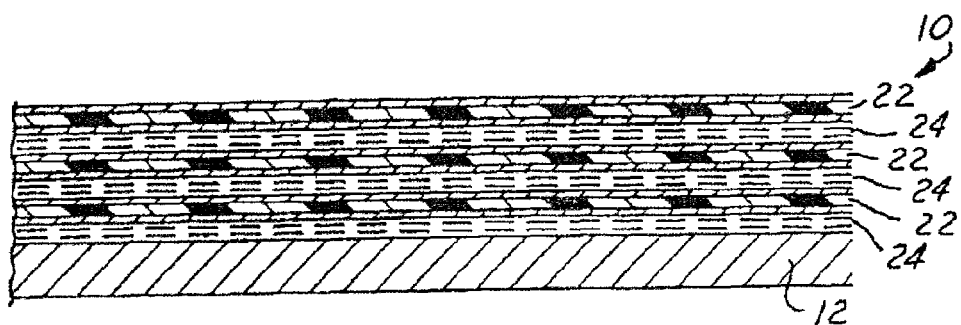
FIG. 2 is a cross-sectional illustration an embodiment of a surface treatment for application to an aircraft wing surface in accordance with the present invention, the surface treatment illustrated without topcoat paint.
Figure 3:
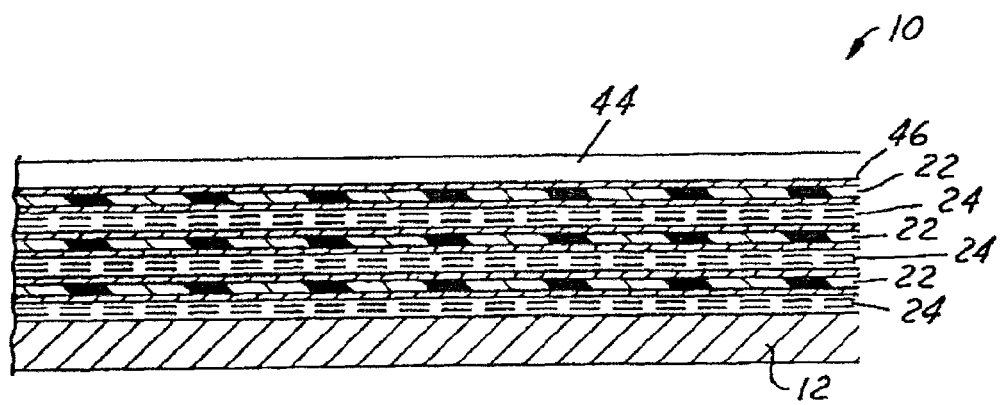
FIG. 3 is a cross-sectional illustration an embodiment of a surface treatment for application to an aircraft wing surface in accordance with the present invention, the surface treatment illustrated as a new plane treatment with a topcoat paint.
Figure 4:
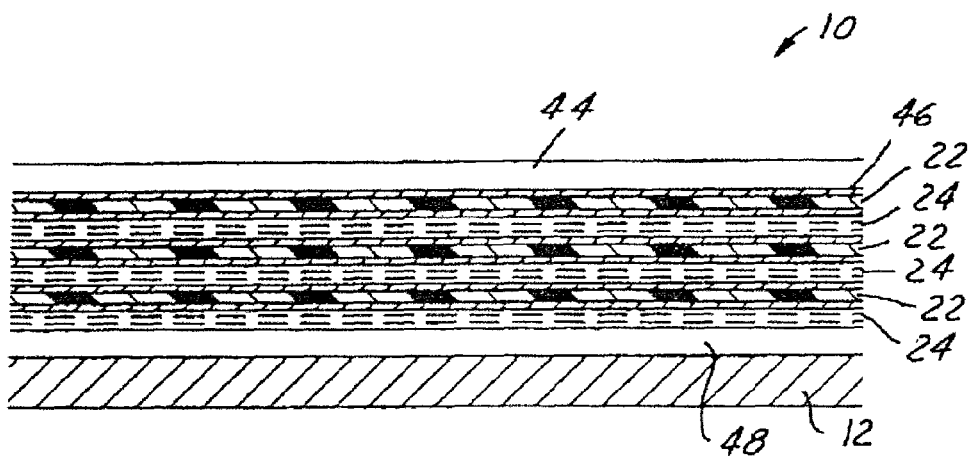
FIG. 4 is a cross-sectional illustration an embodiment of a surface treatment for application to an aircraft wing surface in accordance with the present invention, the surface treatment illustrated as a aircraft retrofit treatment with a topcoat paint and a base paint.

Furthermore, the present invention may be applied to the airplane wing surface 12 in a variety of fashions. FIG. 2 represents a simple direct application to the airplane wing surface 12. Although no paint or additional surface coatings are illustrated in FIG. 2, it is contemplated that they may be utilized. FIG. 3 represents an embodiment optimized for new aircraft application. In this scenario, the multiple layers 40 of the present invention are applied directly to the airplane wing surface 12 and an outer painted surface 44 may be applied to the outer treatment surface 46. This allows the present invention to be utilized on newly constructed aircraft 12 while still allowing airplane manufacturers and airlines to retain the outward appearance desired by their customers. Finally, FIG. 4 is an illustration of the present invention's ability to be implemented on existing aircraft as an aircraft retrofit. In this case, the present invention can be applied directly on top of an existing base paint 48, while further including an outer painted surface 44 for appearance sake. Although a sample of embodiments for application of the present invention have been described, it should be understood that a wide variety of modification and configurations are contemplated.

For illustrative purposes, the following is a further explanation as to the functioning of the present invention. The enthalpy of condensation of water vapor at 300K to a surface at 273K (0 deg C.) is about 597 calories (2500 Joules) per gram. The weight of water vapor at 50% saturation at 27 degrees C. in one cubic meter of air is about 13 grams. Therefore, the mass of water vapor within 1 centimeter of a surface one meter on a side would only be about 0.13 grams, but the surface would have to carry away about 325 joules of energy for condensation of the water vapor to take place. If this were to be accomplished in one second the heat flow rate would have to be 325 watts. This implies that a large amount of heat must be dissipated before condensation can take place. The present invention can prevent the initial water vapor that does condense from coalescing into larger moieties that could eventually reach an inversion population level forming frost. It should be understood that the numerical values listed about were intended for illustrative purposes only.

While particular embodiments of the invention have been shown and described, numerous variations and alternative embodiments will occur to those skilled in the art. Accordingly, it is intended that the invention be limited only in terms of the appended claims.

What is claimed is:

1. A surface treatment for application to an aircraft wing surface comprising:
   a plurality of bonded layers that bond to the aircraft wing surface, each of said plurality of bonded layers comprising:
   a first metallic film comprising:
   a first polymer film; and at least one first reflective metallic coating applied to said first polymer film; and
   a second metallic film comprising:
   a second polymer film: and
   at least one second reflective metallic coating applied to said second polymer film;
   a hollow cell structure sealed to said first metallic film on a first side and sealed said second metallic film on a second side to create a matrix of dead air pockets; and
   an outer painted surface applied to the outer treatment surface of said plurality of bonded layers.

2. A surface treatment as described in claim 1, wherein said hollow cell structure comprises a webbing fabric.

3. A surface treatment as described in claim 1, wherein said hollow cell structure is adhesively bonded to said first polymer film.

4. A surface treatment as described in claim 1, wherein said first polymer film comprises Polyethylene terephthalate.

5. A surface treatment as described in claim 1, wherein said at least one first metallic coating comprises mirrored coating.

* * * * *